United States Patent [19]

Smith

[11] Patent Number: 5,263,771

[45] Date of Patent: Nov. 23, 1993

[54] ANTI-LOCK BRAKE POWERING SYSTEM

[75] Inventor: Richard W. Smith, Salem, Ohio

[73] Assignee: At-A-Glance, Inc., Salem, Ohio

[21] Appl. No.: 886,252

[22] Filed: May 21, 1992

[51] Int. Cl.⁵ .............................................. B60T 8/32
[52] U.S. Cl. ...................................... 303/91; 303/20; 303/7; 303/100
[58] Field of Search ...................... 303/100, 91, 92, 7, 303/20, 102, 103; 188/3 R, 112 R

[56] References Cited

U.S. PATENT DOCUMENTS 5,039,173  8/1991  Emig et al. .
5,085,489  2/1992  Emig et al. .
5,120,114  6/1992  Schlichenmaier et al. ........ 303/20 X Primary Examiner—Douglas C. Butler
Attorney, Agent, or Firm—Frederic E. Naragon

[57] ABSTRACT

An anti-lock brake powering system for use on a tractor having a power source and power cord with a connecting device with multiple circuits between the tractor and a trailer with one circuit providing power to the brake lights of a trailer and a switch disposed in the tractor to provide power to the brake lights of a trailer equipped with a conventional brake system when the switch is in one position so that when the brakes of the tractor are applied a pressure sensitive switch disposed in the tractor is activated and lights the brake lights of the tractor and lights the brake lights of the trailer equipped with a conventional brake system and so that when the switch is moved to a second position, continuous electrical power is supplied to the anti-lock brake system of a trailer equipped with an anti-lock brake system and when the brakes of the tractor are applied the pressure sensitive switch disposed in the tractor is activated and lights the brake lights of the tractor and a pressure sensitive switch disposed in the trailer equipped with an anti-lock brake system is activated and lights the brake lights of the trailer equipped with an anti-lock brake system.

3 Claims, 1 Drawing Sheet

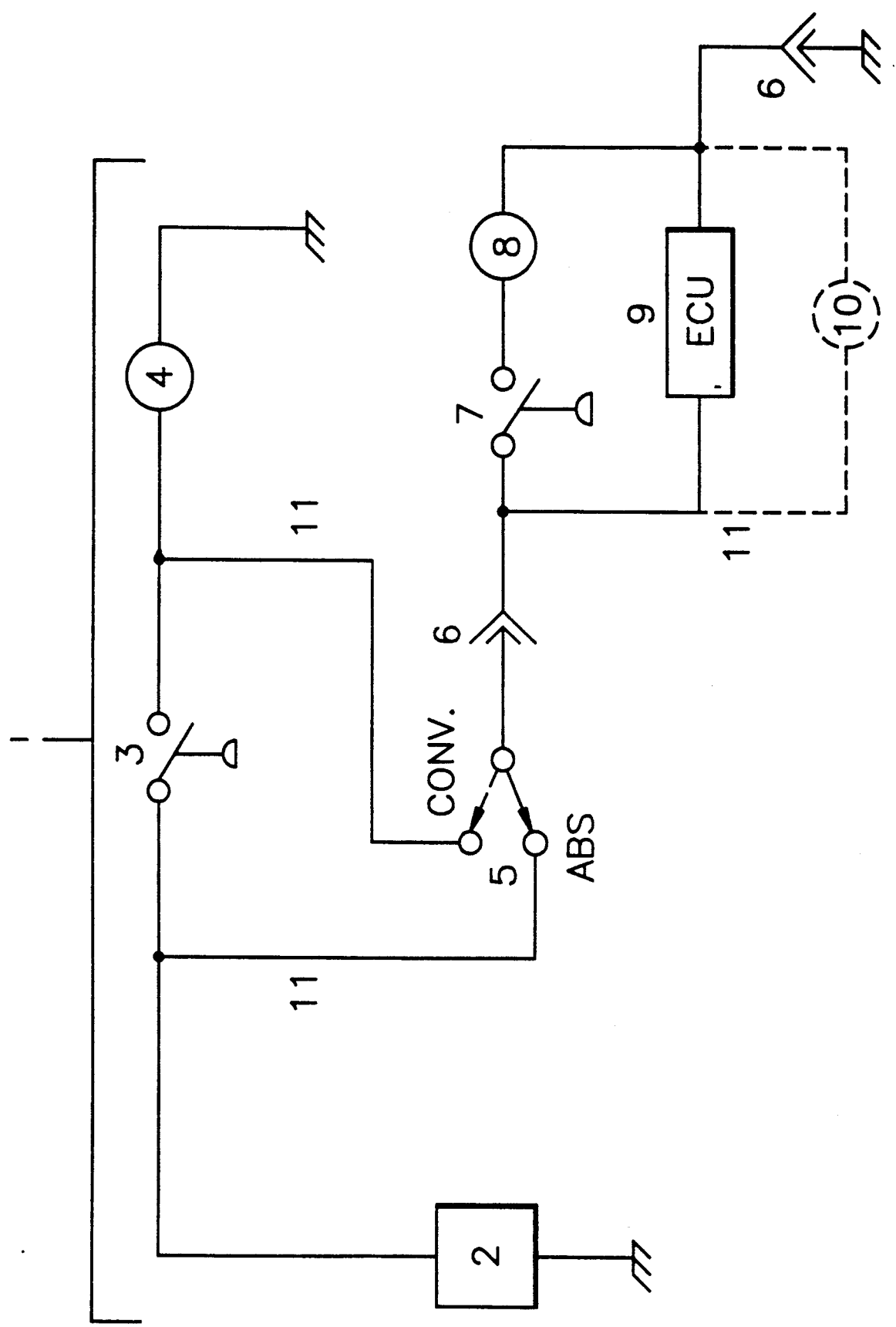

ANTI-LOCK BRAKE POWERING SYSTEM

BACKGROUND OF THE INVENTION

This invention relates in general to a system for powering anti-lock brakes on tractor trailers which avoids the necessity of providing additional electric lines between the tractor and trailer and further avoids the necessity of providing a separate power source on the trailer for anti-lock brakes.

In response to a directive in the Truck and Bus Safety Reform Act of 1988, the National Highway Traffic Safety Administration (NHTSA) issued a report on heavy truck and trailer brakes. "NHTSA officials are very encouraged from what they've learned so far in their 200-tractor, two year anti-lock brake tests which will conclude at the end of this month" (Heavy Duty Trucking, June 1991, pg. 10). "It's a virtual certainty that Congress and NHTSA will require anti-lock. It's just a matter of time. Anti-lock will come first on tractors, later on trailers—perhaps by 1996" (Heavy Duty Trucking, November 1991, pg. 67).

One major difference between tractor anti-lock brakes and trailer anti-lock brakes is that tractor anti-lock brakes are powered continuously from the tractor electrical system, whereas trailer anti-lock brakes must derive their power from the trailer stop light circuit as required under current Federal Motor Vehicle Safety Standard (FMVSS) No. 121. This arrangement is less than ideal since power is supplied to the trailer anti-lock system only when brakes are applied. With continuous power as provided in the present invention, the trailer's ECU (Electronic Control Unit) of the anti-lock system can perform periodic self-checks, which enhances the system's reliability. Both vehicle and anti-lock manufacturers, as well as NHTSA and the fleets want to find out about anti-lock performance and reliability when powering the trailer anti-lock systems in ways other than the intermittent trailer stop light circuit.

A second portion of the NHTSA field test—trailer anti-lock—is now being conducted and is scheduled to run until 1993, when most trailers will have run two years.

Four different systems of powering anti-lock brakes on trailers will be tested and are as follows:

1) The standard seven-pin cord and plug configuration between tractor and trailer that is currently in widespread use will provide power from the stop light circuit only when brakes are applied. With this system, any tractor remains interchangeable with any trailer;

2) A European-style ISO connector will provide power to the anti-lock brake system in addition to the standard seven-pin cord and plug configuration. This requires both tractor and trailer to be wired with two connectors, the second one powering trailer anti-lock brakes;

3) A "halo" connector will provide power to the anti-lock brake system. This is a seven-pin modified configuration to include an additional eight circuits. Trailers using the additional eight circuits will need nose boxes of special design to mate with this connector;

4) Battery power on the trailer will provide power to the anti-lock brake system. An inboard battery system will provide constant voltage to anti-lock ECU's. The battery will be charged through the seventh unused pin (which is already used by many fleets to power trailer accessories such as interior lights) in the trailer cord.

The present invention provides a system for powering anti-lock brake systems on tractor trailers by use of the standard existing seven way cord and plug configuration used between a tractor and a trailer without modifying the seven way cord and plug configuration and provides continuous electrical power to the anti-lock brake system.

Some examples of prior art anti-lock brake powering systems are set forth in patents briefly described below:

U.S. Pat. No. 5,039,173 issued to Emig et al. discloses a system providing a separate battery located on the trailer which in combination with the tractor power source, powers the anti-lock brake system and the electronic control unit of the system. This system requires an additional battery which has encountered charging difficulties in the field, requires periodic maintenance, and the installation of such a system is expensive.

U.S. Pat. No. 5,085,489 issued to Emig et al. discloses a system which powers the electronic control unit of the anti-lock brake system from wheel sensors and solenoid valves and from the brake light circuit. This system supplies only partial power to the electronic control unit and no power to the solenoid valves of the anti-lock brake system. The wheel sensors are susceptible to mechanical failure and the system does not supply power unless the wheels of the trailer are moving above a set speed.

Whatever the precise merits, features and advantages of the aforecited references, none fulfills the purpose of the present invention.

The present invention allows the continued use of the standard existing seven way cord and plug configuration presently used on tractor and trailer systems and provides continuous electrical power to the anti-lock brake system of the trailer. Since there is continuous electrical power supplied in the invention, no warm up or self-diagnostics time is necessary before the anti-lock brake system is functional and thus the present invention enhances braking response time. In addition where additional double or triple trailers are used, the present invention maintains a more stable power supply that helps to overcome voltage drop problems between the multiple trailer units.

A further object of the present invention is to eliminate the necessity for an additional power cord from the tractor to the trailer or additional batteries on the trailer to power the anti-lock brake system. By making use of the present existing standard seven way cord and plug configuration between the tractor and trailer, no additional power cord is necessary and no additional power source on the trailer is necessary to power the anti-lock brake system.

Still another object of the present invention is to permit diagnostics to operate continuously in the anti-lock brake system and not just when the brakes are applied as is the case in some of the prior art. In addition, minimal expense is incurred in adapting present tractor trailer systems to the present invention.

Yet another object of the present invention is to permit tractors to be used interchangeably with trailers equipped with either a conventional brake system or an anti-lock brake system.

Further the present invention enhances operation and safety of tractor trailer vehicles by providing continuous electrical power to the anti-lock brake systems.

SUMMARY OF THE INVENTION

In general, on tractor trailers which are equipped with an anti-lock brake system, the brake system is powered through the brake light circuit contained within a seven way cord and plug configuration used between the tractor and trailer thus supplying power from the vehicle to the tractor trailer. In the existing system, power to the anti-lock brake system of the trailer is only supplied when the brakes are applied. A pressure responsive switch is disposed in the brake light line at the tractor which is responsive to air brake pressure in the brake lines. When the brakes are applied, power is supplied to the anti-lock brake system.

In the present invention, an additional pressure responsive switch is positioned in the relay valve at the rear of the trailer and is disposed in the trailer brake light circuit and is responsive to air pressure in the trailer air brake lines. In addition, a switch means is disposed in the tractor and is connected to the brake line circuit so that when the switch means is placed in one position the existing electrical brake light circuit functions normally to operate the stop lights of a conventional (non-anti-lock brake equipped) trailer from the pressure responsive switch disposed in the tractor. With the switch means placed in a second position, continuous power is supplied to the stop light circuit of a trailer equipped with an anti-lock brake system and the trailer stop lights operate from the pressure responsive switch disposed in the trailer relay valve. Thus, the existing standard seven way cord and plug configuration as is presently employed in most tractors can be utilized to power a trailer equipped with either a conventional brake system or an anti-lock brake system.

BRIEF DESCRIPTION OF THE DRAWING

The single figure is a schematic diagram of the electrical circuit of the invention.

DETAILED DESCRIPTION OF THE DRAWING

Reference is now made to the drawing wherein the present invention is illustrated in detail and wherein the components bear reference numerals.

The figure is a schematic diagram of the preferred embodiment of the invention and illustrates an anti-lock brake powering system 1 comprising an electrical power source 2 disposed in the tractor, a pressure switch 3 disposed in the tractor, stop lights 4 disposed in the tractor, a switch means 5 disposed in the tractor, cord and connecting means with multiple circuits 6 between the tractor and trailer, pressure switch 7 disposed in the trailer equipped with an anti-lock brake system, stop lights 8 disposed in the trailer equipped with an anti-lock brake system, electronic control unit 9 disposed in a trailer equipped with an anti-lock brake system, stop lights 10 disposed in a trailer equipped with a conventional brake system and wiring 11 disposed in the tractor, between the tractor and trailer, and in the trailer.

DESCRIPTION OF THE PREFERRED EMBODIMENT

Referring now to the figure, a schematic diagram of the invention, the preferred embodiment of the present invention is shown as it would be installed in a tractor and trailer equipped with a conventional brake system or a trailer equipped with an anti-lock brake system.

In general, a switch means 5, disposed in the tractor when moved to one position provides an electrical circuit to the trailer brake light line so that when the brakes of the tractor are applied, power flows from power source 2 through pressure sensitive switch 3 into tractor brake lights 4 and through closed contacts of switch means 5, cord and connecting means 6, wiring 11 and into conventional trailer brake lights 10, lighting the brake lights of the tractor and trailer.

Switch means 5 when moved to a second position, provides an electrical circuit to the trailer brake light line so that continuous power flows from power source 2 through closed contacts of switch means 5, cord and connecting means 6, wiring 11 and into the anti-lock brake system of the trailer. In addition, when the brakes of the tractor are applied, power flows through the pressure sensitive switch 3 to the tractor brake lights 4 and pressure sensitive switch 7 to the trailer brake lights 8 and lights the brake lights of the tractor and trailer.

Although the present invention has been described in preferred form with a certain degree of particularity, it is understood that the present disclosure of the preferred form has been made only by way of example and numerous changes in the details of construction and the combination arrangement of parts may be resorted to without departure from the spirit and scope of the invention as hereinafter claimed.

What is claimed is:

1. An anti-lock brake power system for use on a tractor having a power source and a cord and connecting means with multiple circuits providing power from the tractor to a trailer, wherein one of the circuits is a brake line circuit and having a pressure sensitive switch disposed in the brake line circuit in the tractor responsive to air pressure in the brake lines of the tractor so that when the brakes of the tractor are applied power flows from the power source through the brake light circuit and pressure sensitive switch and lights brake lights of the tractor and through the brake light circuit of the cord and connecting means and lights brake lights of the trailer comprising the power source of the vehicle, wiring, a pressure sensitive switch disposed in the tractor, a switch means disposed in the tractor, a cord and connecting means with multiple circuits from the tractor to a trailer equipped with either a conventional brake system or an anti-lock brake system, brake lights in the tractor and trailer, and a pressure sensitive switch disposed in a trailer equipped with an anti-lock brake system which is responsive to air pressure in the brake lines of the trailer, so that when the switch means disposed in the tractor is moved to one position and when the brakes of the tractor are applied, the circuit is functional for a trailer equipped with a conventional brake system and power flows from the tractor power source through the wiring and tractor pressure switch and lights the brake lights of the tractor and through the switch means and the brake line circuit of the cord and connecting means between the tractor and trailer and lights the brake lights of the trailer in a trailer equipped with a conventional brake system, and when the switch means is moved to a second position the circuit is functional for a trailer equipped with an anti-lock brake system so that continuous power flows from the vehicle power source through the wiring and switch means, through the brake light circuit of the cord and connecting means between the tractor and trailer providing continuous electrical power to the anti-lock brake system of a trailer equipped with an anti-lock brake system, and so that when the brakes of the tractor are applied, the power flows through the wiring of the circuit and through the pressure sensitive switch disposed in the tractor and lights the brake lights of the tractor and power flows through the pressure sensitive switch disposed in the trailer and lights the brake lights of a trailer equipped with an anti-lock brake system.

2. The improvement of claim 1 wherein the connecting means between the tractor and trailer is a seven way cord and plug configuration.

3. The improvement of claim 1 wherein the connecting means between the tractor and trailer is a six way cord and plug configuration.

* * * * *